United States Patent
Chen et al.

(10) Patent No.: US 7,995,656 B2
(45) Date of Patent: Aug. 9, 2011

(54) SCALABLE VIDEO CODING WITH TWO LAYER ENCODING AND SINGLE LAYER DECODING

(75) Inventors: Peisong Chen, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1346 days.

(21) Appl. No.: 11/373,604

(22) Filed: Mar. 9, 2006

(65) Prior Publication Data

US 2006/0230162 A1    Oct. 12, 2006

Related U.S. Application Data

(60) Provisional application No. 60/660,877, filed on Mar. 10, 2005, provisional application No. 60/713,208, filed on Aug. 30, 2005.

(51) Int. Cl.
*H04B 1/66* (2006.01)
*H04N 7/12* (2006.01)
*H04N 11/02* (2006.01)
*H04N 11/04* (2006.01)

(52) U.S. Cl. .............................. 375/240.23; 375/240.26

(58) Field of Classification Search ............. 375/240.23, 375/375.26
See application file for complete search history.

(56) References Cited

U.S. PATENT DOCUMENTS

| | | | |
|---|---|---|---|
| 5,818,531 A | 10/1998 | Yamaguchi et al. | |
| 6,275,531 B1 | 8/2001 | Li | |
| 6,330,280 B1 | 12/2001 | Suzuki | |
| 6,600,836 B1 | 7/2003 | Thyagarajan et al. | |
| 7,430,336 B2 | 9/2008 | Raveendran | |
| 2004/0062304 A1 * | 4/2004 | Dolbear et al. | 375/240.1 |
| 2005/0249285 A1 | 11/2005 | Chen et al. | |
| 2005/0265461 A1 | 12/2005 | Raveendran | |
| 2006/0018383 A1 | 1/2006 | Shi et al. | |
| 2006/0072667 A1 * | 4/2006 | Kirenko et al. | 375/240.23 |

FOREIGN PATENT DOCUMENTS

| | | |
|---|---|---|
| CL | 1133-1995 | 4/1996 |
| CL | 0542-2006 | 8/2006 |
| CL | 0543-2006 | 9/2006 |
| CL | 0539-2006 | 11/2006 |
| CL | 0544-2006 | 2/2007 |

(Continued)

OTHER PUBLICATIONS

International Search Report—PCT/US2006/008761—International Search Authority—European Patent Office—Aug. 22, 2006.

(Continued)

*Primary Examiner* — David C Payne
*Assistant Examiner* — Tanmay K Shah
(74) *Attorney, Agent, or Firm* — Dang Vo; John G. Rickenbrode

(57) ABSTRACT

Some embodiments comprise a method of decoding a video bitstream that include receiving a first layer of data and a second layer of data, combining the received first layer data and the received second layer data, and decoding the combined data. Also, a method of video encoding that includes selecting data for encoding in a first layer and a second layer so as to allow decoding of the data in a single combined layer, and encoding the selected data in the first layer and in the second layer by encoding a coefficient in the first layer and encoding a differential refinement to the first layer coefficient in the second layer.

68 Claims, 9 Drawing Sheets

FOREIGN PATENT DOCUMENTS

| CL | 0541-2006 | 1/2008 |
|---|---|---|
| JP | 9098434 A | 4/1997 |
| JP | 9182084 A | 7/1997 |
| RU | 2201654 | 3/2003 |
| WO | 03063495 | 7/2003 |

OTHER PUBLICATIONS

Written Opinion—PCT/US2006/008761—International Search Authority—European Patent Office, Berlin—Aug. 22, 2006.

International Preliminary Report on Patentability—PCT/US2006/008761—International Search Authority—The International Bureau of WIPO—Sep. 12, 2007.

Macnicol J et al., "Scalable Video Coding by Stream Morphing," IEEE Transactions on Circuits and Systems for Video Technology, vol. 15, No. 2, Feb. 2005, pp. 306-319, XP001222992, IEEE, Piscataway, NJ.

Sarshar N. et al., "Minimax Multiresolution Scalar Quantization," Data Compression Conference, 2004, Proceedings, DCC 2004 Snowbird, UT, USA, Mar. 23-25, 2004, pp. 52-61, XP010692175, Piscataway, NJ.

Halbach T. et al., "SNR Scalability by Transform Coefficient Refinement for Block-Based Video Coding," Jul. 8, 2003, Proceedings of the SPIE, SPIE, Bellingham, VA, pp. 135-140, XP002998741.

Ma S. et al., "A Study on the Quantization Scheme in H.264/AVC and Its Application to Rate Control," Lecture Notes in Computer Science 3333, Springer Verlag, New York, NY, Nov. 30, 2004, pp. 192-199, XP008066743.

Richardson, Iain E. G., Video coding. H.264 and MPEG-4 Standards of New Generation, Tekhnosfera, Moscow, 2005, translation of 2003 English edition, p. 187-205.

\* cited by examiner

SCALABLE VIDEO CODING WITH TWO LAYER ENCODING AND SINGLE LAYER DECODING

CLAIM OF PRIORITY UNDER 35 U.S.C. §119

The present Application for Patent claims priority to Provisional Application No. 60/660/877 entitled "TWO PARALLEL ENCODING AND SINGLE LAYER DECODING" filed Mar. 10, 2005, and Provisional Application No. 60/713,208 entitled "SCALABLE VIDEO CODING WITH TWO LAYER ENCODING AND SINGLE LAYER DECODING" filed Aug. 30, 2005, both of which are hereby expressly incorporated by reference herein.

BACKGROUND

1. Field

This invention relates to a method and an apparatus for encoding and decoding scalable video data.

2. Background

Due to the explosive growth and great success of the Internet and wireless communication, as well as increasing demand for multimedia services, streaming media over the Internet and mobile/wireless channels have drawn tremendous attention. In heterogeneous Internet Protocol (IP) networks, video is provided by a server and can be streamed by one or more clients. Wired connections include dial-up, ISDN, cable, xDSL, fiber, LAN (local area network), WAN (wide area network) and others. The transmission mode can be either uni-cast or multi-cast. The variety of individual client devices, including PDA (personal digital assistant), laptop, desktop, set-top box, TV, HDTV (high-definition television), mobile phone and others, requires bitstreams of different bandwidths simultaneously for the same content. The connection bandwidth could vary quickly with the time (from 9.6 kbps to 100 Mbps and above), and can be faster than a server's reaction.

Similar to the heterogeneous IP network is mobile/wireless communication. Transport of multimedia content over mobile/wireless channels is very challenging because these channels are often severely impaired due to multi-path fading, shadowing, inter-symbol interference, and noise disturbances. Some other reasons such as mobility and competing traffic also cause bandwidth variations and loss. The channel noise and the number of users being served determine the time-varying property of channel environments. In addition to environmental conditions, the destination network can vary from second to third generation cellular networks to broadband data-only networks due to geographic location as well as mobile roaming. All these variables call for adaptive rate adjustment for multimedia content, even on the fly. Thus, successful transmission of video over heterogeneous wired/wireless networks requires efficient coding, as well as adaptability to varying network conditions, device characteristics, and user preferences, while also being resilient to losses.

To meet different user requirements and to adapt to channel variation, one could generate multiple independent versions of bitstreams, each meeting one class of constraints based on transmission bandwidth, user display and/or computational capability, but this is not efficient for server storage and multicast application. In scalable coding, where a single macro-bitstream accommodating high-end users is built at the server, the bitstreams for low-end applications are embedded as subsets of the macro-bitstream. As such, a single bitstream can be adapted to diverse application environments by selectively transmitting sub-bitstreams. Another advantage provided by scalable coding is for robust video transmissions on error prone channels. Error protection and error concealment can be easily handled. A more reliable transmission channel or a better error protection can be applied to base layer bits that contain the most significant information.

There are spatial, temporal and signal to noise ratio (SNR) scalabilities in hybrid coders like MPEG-1, MPEG-2, MPEG-4 (collectively referred to as MPEG-x), H.261, H.262, H.263, and H.264 (collectively referred to as H.26x). In hybrid coding, temporal redundancy is removed by motion-compensated prediction (MCP). Video is typically divided into a series of groups of pictures (GOP), where each GOP begins with an intra-coded frame (I) followed by an arrangement of forward (and/or backward) predicted frames (P) and bi-directional predicted frames (B). Both P frames and B frames are inter-predicted frames employing MCP. A base layer can contain the most significant information of I frames, P frames or B frames at a lower quality level, and an enhancement layer can contain higher quality information of the same frames or additional temporal scaling frames not contained in the base layer. SNR scalability can be accomplished at a decoder by selectively omitting decoding of the higher quality data in the enhancement layer while decoding the base layer data. Depending on how the data is parsed between the base layer and the enhancement layer, decoding of the base layer plus enhancement layer data can introduce increased complexity and memory requirements. Increased computational complexity and increased memory requirements can be detrimental to the performance of power limited and computationally limited devices such as PDA's (personal digital assistants), mobile phones and the like. What is desired is that the decoding of the base layer plus the enhancement layers does not significantly increase the computational complexity and memory requirements of such devices.

SUMMARY

A method and apparatus for decoding multimedia bitstream is disclosed, comprising method and means for receiving a first layer of encoded data and a second layer of encoded data; combining the received first layer encoded data and the received second layer encoded data; and decoding the combined data; wherein the first layer comprises a base layer and the second layer comprises an enhancement layer.

In another aspect, an apparatus for decoding a multimedia bitstream, comprises a receiver to receive a first layer of encoded data and a second layer of encoded data; a combiner to combine the received first layer encoded data and the received second layer encoded data; and a decoder to decode the combined data; wherein the first layer comprises a base layer and a second layer comprises an enhancement layer.

In the above aspects, the method and apparatus for decoding may further comprise the method or means for receiving a residual error coefficient in the base layer data and receiving a differential refinement to the base layer residual error coefficient in the enhancement layer data; combining the residual error coefficient and the differential refinement with the combined first layer and second layer data; and decoding the combined first layer, second layer and the combined residual error coefficient and differential refinement. Alternatively, the method and apparatus may further comprise method or means for receiving a residual error coefficient in the base layer data and receiving a differential refinement to the base layer residual error coefficient in the enhancement layer data, wherein the base layer residual error coefficient is either a minimum of an original base layer residual error coefficient and an original enhancement layer residual error coefficient or zero, and the enhancement layer differential refinement is determined based on the residual error coefficient and the original enhancement layer residual error coefficient. The method and apparatus for decoding may further comprise method or means for receiving a residual error coefficient in the base layer data and receiving a differential refinement to the base layer residual error coefficient in the enhancement layer data, wherein the base layer residual error coefficient is either a minimum of an original base layer residual error coefficient and an original enhancement layer residual error coefficient or zero, and the enhancement layer differential refinement is determined based on the base layer residual error coefficient and the original enhancement layer residual error coefficient. The method and apparatus for decoding may further comprise method or means for converting the first layer data from a first quantization step size to a second quantization step size, wherein the received second layer data is encoded in the second quantization step size. The method and apparatus for decoding may further comprise method or means for identifying inter-coded data in the combined data, said inter-coded data being associated with the first layer; identifying inter-coded data in the combined data, said inter-coded data being associated with the second layer; and decoding either the identified inter-coded data associated with the first layer or the identified inter-coded data associated with the first and second layers.

The method and apparatus for decoding may further comprise method or means for identifying intra-coded data in the combined data, said intra-coded data being associated with the first layer; and decoding the identified intra-coded data. The method and apparatus for decoding may further comprise method or means for identifying intra-coded data in the combined data, said intra-coded data being associated with the first layer; identifying inter-coded data in the combined data, said inter-coded data being associated with the second layer; and decoding either the identified intra-coded data or the identified inter-coded data.

The method and apparatus for decoding may further comprise method or means for converting the first layer data from a first quantization step size to a second quantization step size, wherein the received second layer data is encoded in the second quantization step size. The method and apparatus for decoding may further comprise method or means for identifying first layer intra-coded data in a first pass, to decode the identified second layer intra-coded data in a second pass, and combining the decoded first layer intra-coded data and the decoded second layer intra-coded data. The method and apparatus for decoding may further comprise method or means for dequantizing the combined first layer and second layer data; and inverse transforming the dequantized data.

Furthermore, the above aspects may be implemented by a computer-readable medium and/or a processor.

In still another aspect, a method and apparatus for encoding multimedia data may comprise method or means for selecting data for encoding in a first layer and a second layer to allow decoding of the data in a single combined layer; and encoding the selected data in the first layer and the second layer.

In yet another aspect, an apparatus for encoding multimedia data, comprising a receiver configured to select data for encoding in a first layer and a second layer to allow decoding of the data in a single combined layer; and an encoder configured to encode the selected data in the first layer and the second layer.

In the above aspects, the encoding may comprises encoding a coefficient in the first layer; and encoding a differential refinement of the first layer coefficient in the second layer. The first layer encoded data may comprise a first coefficient, and the second layer encoded data may comprise a second coefficient, wherein the first and second coefficients are used for decoding. The data may comprise intra-coded data. If so, the method and apparatus for encoding may further comprise method or means for encoding the intra-coded data in the first layer or in the first and second layers.

The data may comprise inter-coded data. If so, the method and apparatus for encoding may further comprise method or means for encoding the inter-coded data in the second layer.

The method and apparatus for encoding may further comprise method or means for encoding some of the selected data as inter-coded data in the first layer and some of the selected data as inter-coded data in the second layer.

If so, the method and apparatus for encoding may further comprise method or means for encoding the selected data as intra-coded data in the first layer.

The method and apparatus for encoding may further comprise method or means for selecting a first prime coefficient based on the first and second coefficients; and calculating a second prime coefficient based on the first and second coefficients, wherein encoding further comprises using the first prime coefficient for encoding in the first layer, and using the second prime coefficient for encoding in the second layer. The first coefficient may be a base layer residual error coefficient and the second coefficient is an enhancement layer residual error coefficient, and the method and apparatus may further comprise method or means for selecting the first prime coefficient to be either a minimum of the first coefficient and the second coefficient or zero, and calculating further comprises setting the second prime coefficient equal to the second coefficient.

The method and apparatus for encoding may further comprise associating block header information and motion vector information with the first layer, said block header information and motion vector information being derived from the received data. The method and apparatus for encoding may further comprise quantizing the first layer encoded data at a first step size, and quantizing the second layer encoded data at a second step size, wherein the first step size and second step size are related by a scale factor.

The method and apparatus for encoding may further comprise encoding overhead information, wherein the overhead information is a member of a group consisting of data identifying a number of layers, data identifying a layer as a base-layer, data identifying a layer as an enhancement layer, data identifying an inter-relationship between layers, and data identifying a layer as a final enhancement layer.

Furthermore, the above aspects may be implemented by a computer-readable medium and/or a processor.

DETAILED DESCRIPTION

Methods and apparatus to provide multiple layers of video, including a base layer and one or more enhancement layers, with reduced decoder overhead, are described. An encoding algorithm generates base layer and enhancement layer coefficients, which may be combined at the decoder before dequantization when both layers are available for decoding. Aspects of some embodiments provide for acceptable base layer video when the enhancement layer is not available or the decoder may choose not to decode the enhancement layer for reasons such as, for example, power savings. In the following description, specific details are given to provide a thorough understanding of the embodiments. However, it will be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments.

It is also noted that the embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
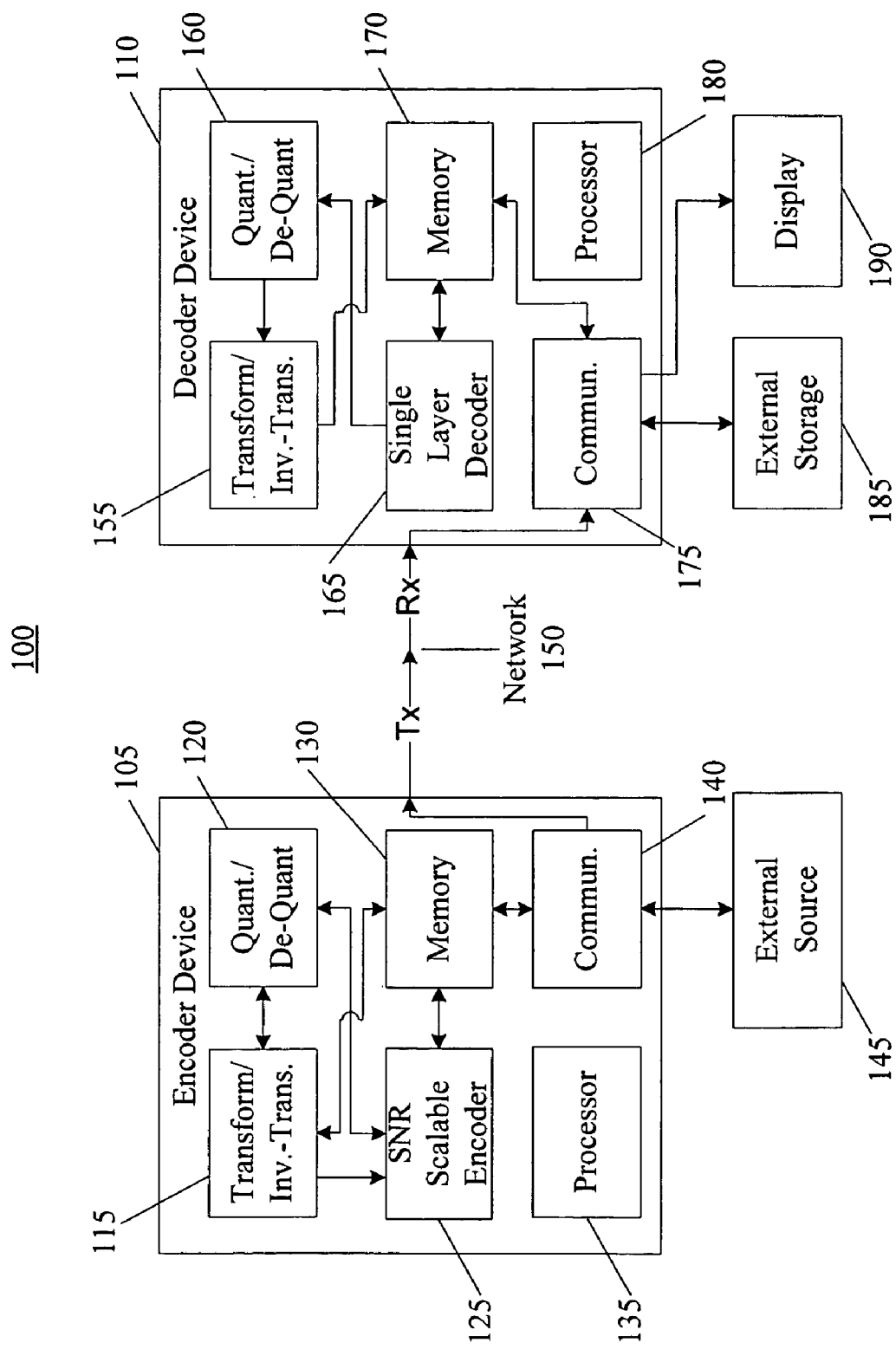
FIG. 1 is an illustration of an example of a communication system for delivery of streaming video.

FIG. 1 is an illustration of an example of a communication system for delivery of streaming video. The system 100 includes encoder device 105 and decoder device 110. Encoder device 105 further includes transform component 115, quantization component 120, SNR scalable encoder component 125, memory component 130, processor component 135, and communications component 140. Processor 135 provides the computing platform to perform the processes of the other components. Transform component 115 transforms video data from the spatial domain to another domain, such as the frequency domain in the case of DCT (discrete cosine transform). The data that is being transformed can be intra-coded data where the actual video data is transformed, or it can be intra-coded data where the spatial prediction residual is transformed, or it can be inter-coded data where a residual error is transformed. Other digital transforms include the Hadamard transform, DWT (discrete wavelet transform), and integer transforms such as used in H.264.

Quantization component 120 allocates the number of bits to represent each of the transformed coefficients. The quantization of the transformed coefficients may be changed for every block, or every macroblock. A macroblock may be a block of 16×16 pixels (made up of a 16×16 Luma block, and two 8×8 Chroma blocks). The quantization parameter, QP, determines the level of quantization that is performed. More digital compression is realized by increasing QP providing for lower quality digital representation of the coefficients that can be encoded in the base layer of a SNR scalable video stream. Decreasing QP allows for higher quality digital representation of the coefficients that can be encoded in the enhancement layer of an SNR scalable video stream. SNR scalable encoder component 125 performs an interactive selection of coefficients, in parallel for example, that parses the coefficients into base layer coefficients and enhancement layer coefficients. The interactive selection of base layer and enhancement layer coefficients may be done in a way so as to enable the decoder device to decode the two layers, the base layer plus the enhancement layer data, in a single layer and will be discussed in more detail below. Memory component 130 is used to store information such as raw video data to be encoded, encoded video data to be transmitted, or intermediate data being operated on by the various encoder components.

Transform component 115 and quantization component 120 also perform inverse transformation and de-quantization, respectively. These inverse operations are performed in the encoder to allow for reconstruction of the coefficients in the same way as a decoder device, such that the residual error calculations and enhancement layer coefficient calculations are as accurate as possible.

Communications component 140 contains logic used to receive, e.g., a receiver, data to be encoded from external source 145. External source 145 could be, for example, external memory, the Internet, a live video and/or audio feed, and receiving the data can include wired and/or wireless communications. Communications component 140 also contains logic to transmit (Tx) encoded data over Network 150. Encoded data may comprise transformed data, quantized data, variable length coded data or any combination thereof. Network 150 can be part of a wired system such as telephone, cable, and fiber optic, or a wireless system. In the case of wireless, communication systems, network 150 can comprise, for example, part of a code division multiple access (CDMA or CDMA2000) communication system or alternately, the system can be a frequency division multiple access (FDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1×EV-DO or 1×EV-DO Gold Multicast) system, or in general any wireless communication system employing a combination of techniques. One or more elements of encoder device 105 may be rearranged and/or combined. For example, processor component 135 may be external to encoder device 105.

Decoder device 110 contains similar components as encoder device 105 including inverse transform component 155, de-quantization component 160, single layer decoder component 165, memory component 170, communications component 175 and processor component 180. Decoder device 110 receives encoded data that has been transmitted over network 150 or from external storage 185. Encoded data may comprise transformed data, quantized data, variable length coded data or any combination thereof. Communications component 175 contains logic used for receiving (Rx) encoded data in conjunction with network 150, as well as logic for receiving encoded data from external storage 185.

External storage 185 could be, for example, external RAM or ROM, or a remote server. Single layer decoder component 165 contains logic used for decoding base layer and enhancement layer data. Base layer data can be decoded by itself if, for example, the enhancement layer is not received, or received in a corrupted state, or to conserve battery power, or processing power. Single layer decoder component 165 also contains logic for combining the base layer and enhancement layer data in order to decode the combined data in a single layer. Intra-coded data is processed by dequantization component 160, followed by inverse transform component 155 resulting in a decoded picture that can be displayed on display component 190.

Inter-coded data can be decoded after the reference frame (s), from which it was predicted, is decoded. The residual error coefficients are processed by single layer decoder component 165, dequantization component 160, and inverse transform component 155 resulting in a decoded residual error. The residual error is then combined with a best matching macroblock(s) from the reference frame(s). The decoded frames can be displayed with display component 190, stored in external storage 185 or stored in internal memory of processor component 180. Display component 190 can be an integrated part of the decoding device that contains such parts as video display hardware and logic, including a display screen, or it can be an external peripheral device. Communications component 175 also contains logic used to communicate the decoded frames to external storage component 185 or display component 190. The two layer encoding and single layer decoding performed by SNR scalable encoder component 125 and single layer decoder component 165, respectively, are discussed in more detail below. One or more elements of decoder device 110 may be rearranged and/or combined. For example, processor component 180 may be external to decoder device 110.

In video decoding, a hardware video core, for example, may be used to accelerate the computationally intensive decoding process, especially dequantization and inverse transformation. A hardware video core may contain specialized circuitry and/or processor(s) capable of simultaneous execution (pipelining) of several functions. Pipelining enables a reduction in decoding time. Any interruption in the standard pipelined flow, such as an extra inverse transform, an extra dequantization operation or even extra additions could slow down the whole process. It will be apparent to those of skill in the art that one or more embodiments of the video core may be implemented by hardware, software, firmware, middleware, microcode or any combination thereof. In a conventional single layer decoder, the decoding of I frames, P frames and B frames all follow a similar path. The coefficients, whether representing intra-coded video or residual errors, are dequantized, inverse transformed and then combined with either. spatial prediction coefficients or best matching macroblock coefficients respectively. The encoding and decoding processes described below make scalable decoding of the base layer and/or enhancement layer(s) transparent to the decoder hardware video core. One way of accomplishing this is to decode each layer separately, each in its own pass, and then combine the decoded layers. This two-pass approach can reuse the same hardware circuitry for efficiency. Transparency to the decoder can also be accomplished by combining the base layer data and enhancement layer modifications to the base layer data, before the combined data is decoded in the hardware video core in a single pass, providing more efficiency. For example, a preprocessor such as a DSP (digital signal processor) can perform the combining operation.

Figure 2A:
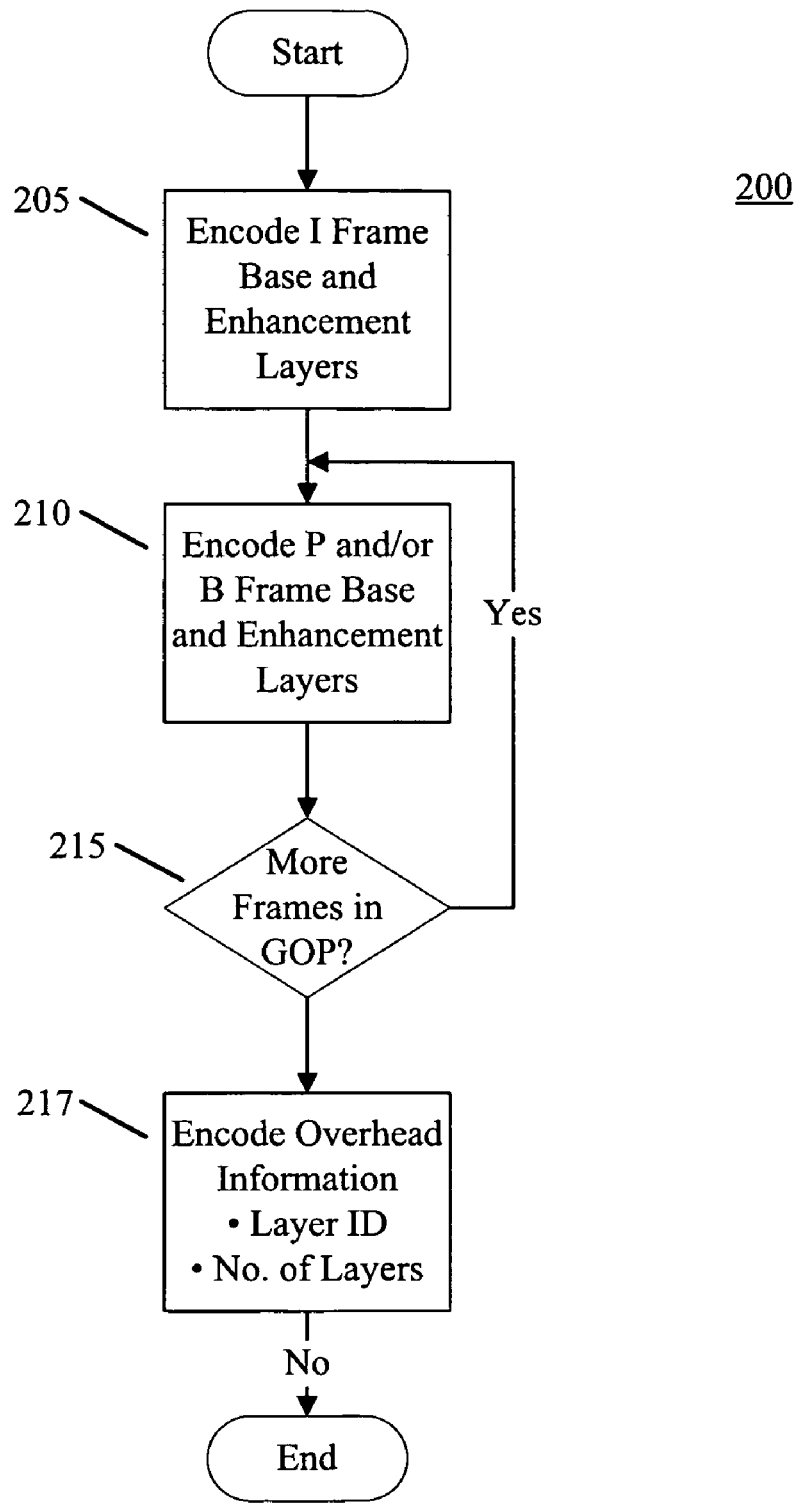
FIG. 2A is a flowchart of one example of encoding SNR scalable streaming video.

FIG. 2A is a flowchart of one example of encoding SNR scalable streaming video. Process 200 depicts the flow of encoding a GOP made up of an initial I frame followed by multiple P and/or B frames. Each frame can contain base layer data and/or enhancement layer data. A person of ordinary skill could also choose to provide additional layers of data.

An I frame is encoded 205 with entirely intra-coded macroblocks (Intra MBs). In H.264, Intra MBs in I frames are encoded with fully exploited spatial prediction, which provides a significant amount of coding gain. There are two submodes: Intra 4×4 and Intra16×16. If the to be encoded base layer and/or enhancement layer are to take advantage of the coding gain provided by spatial prediction, then the base layer is encoded and reconstructed before encoding and reconstructing the enhancement layer. A two pass encoding and reconstructing of I frames is used. In the base layer, a base layer quantization parameter $QP_b$ affords the transform coefficients a coarse quantization step size. The pixel-wise difference between the original frame and the reconstructed base layer frame may be encoded at the enhancement layer. The enhancement layer uses a quantization parameter $QP_e$ which affords a finer quantization step size. Encoding means, such as SNR scalable encoder 125 of FIG. 1 can perform the encoding act 205.

At step 210, the encoder encodes base layer data and enhancement layer data for P and/or B frames in the GOP. Encoding means, such as SNR scalable encoder 125 of FIG. 1 can perform the encoding act 210. It is determined 215 if there are more P or B frames to encode. Encoding means, such as SNR scalable encoder 125 of FIG. 1 can perform determining 215. If more P or B frames remain, step 210 is repeated until all the frames in the GOP are finished being encoded. P and B frames are comprised of inter-coded macroblocks (inter MBs), although there can be Intra MB's in P and B frames as will be discussed below.

In order for a decoder to be able to distinguish between base layer and enhancement layer data, the encoder encodes overhead information, step 217. The types of overhead information include, for example, data identifying the number of layers, data identifying a layer as a base layer, data identifying a layer as an enhancement layer, data identifying inter-relationships between layers (for example, a second layer is an enhancement layer for a first or base layer, or a third layer is an enhancement layer for the second layer), or data identifying a layer as a final enhancement layer in a string of enhancement layers. The overhead information can be contained in headers connected with the base and/or enhancement layer data that it pertains to, or contained in separate data messages. Encoding means, such as SNR scalable encoder 125 of FIG. 1 can perform act 217. One or more elements of process 200 may be omitted, rearranged and/or combined.

Figure 2B:
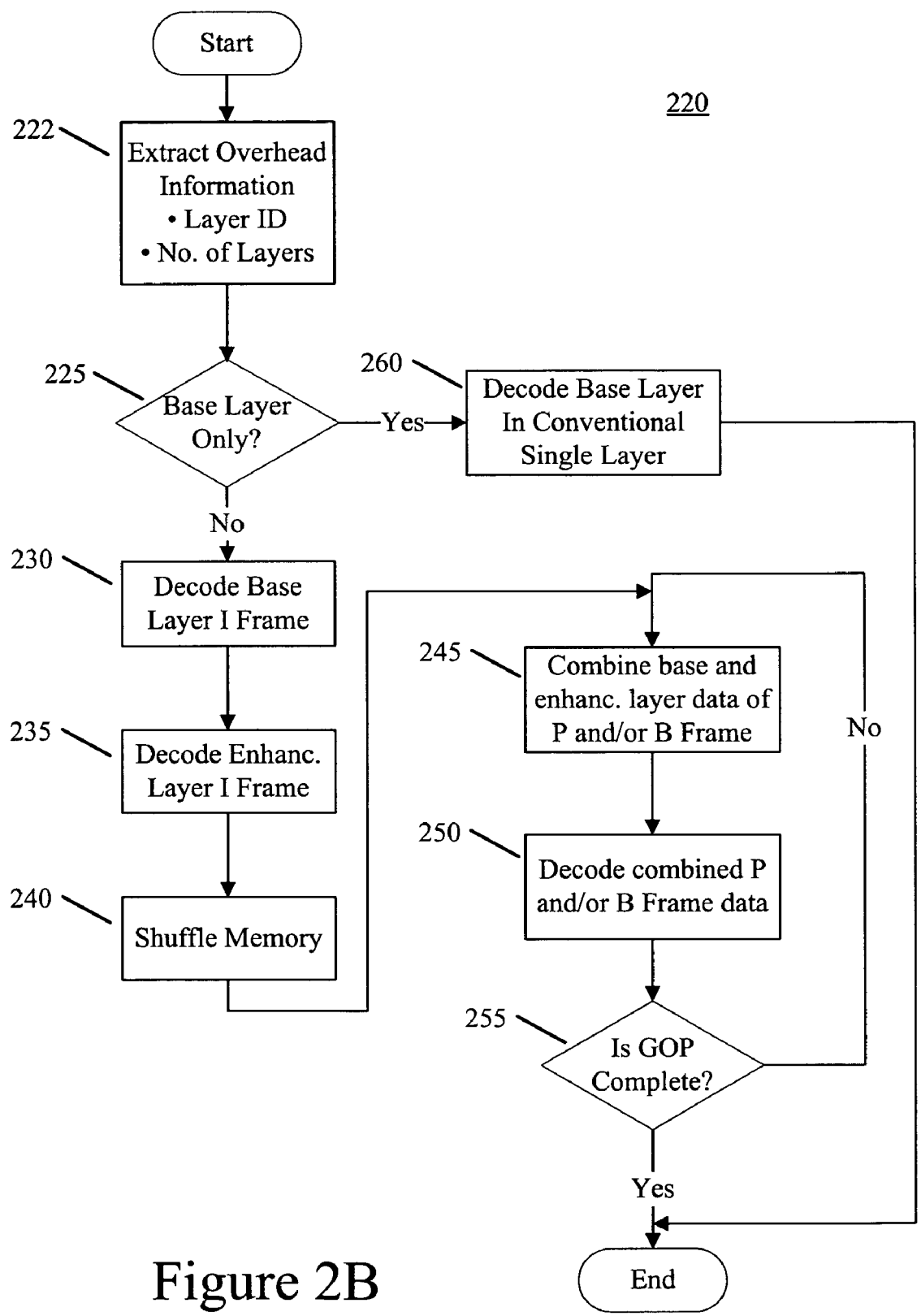
FIG. 2B is a flowchart of one example of decoding, in a single layer, SNR scalable streaming video.

FIG. 2B is a flowchart of one example of decoding, in a single layer, the SNR scalable streaming video encoded by process 200. Process 220 depicts the flow of decoding of the GOP made up of an initial I frame followed by multiple P and or B frames.

The decoder extracts 222 the overhead information, e.g. with an identifier, in order to identify the various layers contained in the bitstream(s) that it receives, as well as the interrelationships between layers. This overhead information enables the decoder to identify the base layer information and choose to decode it alone. In step 225, the decision is made to decode only the base layer, or to decode the combined base and enhancement layer. Decoding means such as single layer decoder component 165 can perform step 225. If only the base layer is to be decoded, the decoder performs conventional single layer decoding of Intra MB's and inter MB's, step 260. Decoding means such as single layer decoder component 165 of FIG. 1 can perform act 260. In this example, if the enhancement layer is also to be decoded, the Intra MB's are decoded in a two pass scheme, or a one pass scheme, while the layers of inter MB's are decoded in a single pass, as will be described in more detail below. The decoder can use the overhead data identifying the number of layers, or the overhead data identifying a layer as the final layer along with the data identifying inter-relationships between layers, to know when it has received all the layers available in the bitstream for the current section that it is processing. Extracting means, such as single layer decoder 165 of FIG. 1 can perform act 222.

In this example, a two pass decoding process is used for each I frame. At step 230, a base layer I frame is decoded in a first pass and, in step 235, an enhancement layer comprising a differential refinement to the base layer is decoded and combined with the base layer (like a P frame with zero motion vectors) to form the enhancement layer I frame. Decoding means, such as single layer decoder 165 of FIG. 1 can perform acts 230 and 235. If the decoder device has no use for the decoded base layer I frame $I_b$, the memory buffer containing $I_b$ can be overwritten and the decoded enhancement layer I frame $I_e$ can be used as the reference for subsequent predicted frames. This memory overwriting, or memory shuffling, is performed in step 240. Memory shuffling means, such as memory component 170 of FIG. 1 can perform act 240. The decoder device may be able to overwrite $I_b$, if the encoder does not use $I_b$ for any subsequent motion compensated prediction.

A single pass decoding is used for P and B frames. As discussed below, the P and B frame base and enhancement layer coefficients are encoded in a way to allow for single pass decoding. The decoder, after receiving the base layer and enhancement layer coefficients, combines them, step 245, and decodes them in a single layer, step 250, just as it would a normally encoded P or B frame. Receiving means, e.g., a receiver, such as communications component 175 of FIG. 1 can perform the receiving step (receiving step not shown in FIG. 2B). Details of combining step 245 and decoding step 250 are discussed below. Combining means, e.g., a combiner, and decoding means such as single layer decoder component 165 of FIG. 1 can perform steps 245 and 250. Decision step 255 checks the bitstream to identify if the GOP being decoded is complete. If the GOP is complete, the process ends and then starts over again at the next GOP. If there are more P and/or B frames remaining in the GOP, steps 245 and 250 are repeated until the GOP is completely decoded. Decoding means such as single layer decoder component 165 of FIG. 1 can perform act 255.

In order to have single layer decoding, the coefficients of two layers are combined before inverse quantization. Therefore the coefficients of the two layers may be generated interactively; otherwise this could introduce a significant amount of overhead. One reason for the increased overhead is that the base layer encoding and the enhancement layer encoding could use different temporal references. An algorithm is needed to generate base layer and enhancement layer coefficients, which can be combined at the decoder before dequantization when both layers are available. At the same time, the algorithm could provide for acceptable base layer video when the enhancement layer is not available or the decoder decides not to decode the enhancement layer for reasons such as, for example, power savings. Before discussing the details of the algorithm, a discussion of standard predictive coding would be useful. One or more elements of process 220 may be omitted, rearranged and/or combined.

Figure 3:
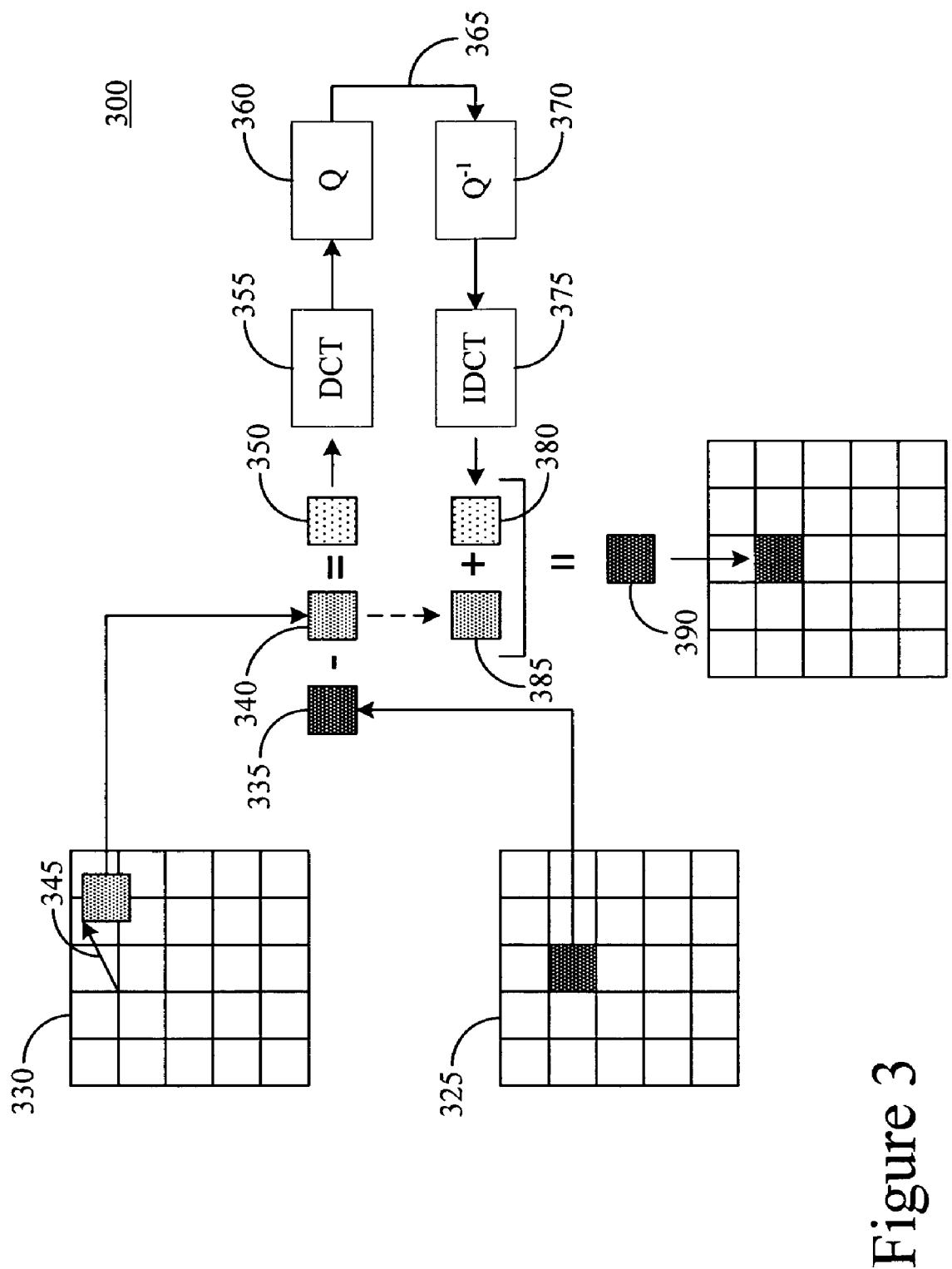
FIG. 3 is an illustration of an example of a P Frame construction process.

P Frames (or any inter-coded sections) can exploit temporal redundancy between a region in a current picture and a best matching prediction region in a reference picture. The location of the best matching prediction region in the reference frame can be encoded in a set of motion vectors. The difference between the current region and the best matching reference prediction region is known as residual error (or prediction error). FIG. 3 is an illustration of an example of a P Frame construction process in, for example, MPEG-4. Process 300 is a more detailed illustration of an example process that could take place in step 210 of FIG. 2A. Process 300 includes current picture 325 made up of 5×5 macroblocks, where the number of macroblocks in this example is arbitrary. A macroblock is made up of 16×16 pixels. Pixels can be defined by an 8-bit luminance value (Y) and two 8-bit chrominance values (Cr and Cb). In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components. Macroblock 335 of current picture 325 is predicted from reference picture 330. Both the current picture 325 and reference picture 330 are located at in the sequence of pictures. A search is made in reference picture 330 to locate best matching macroblock 340 that is closest, in terms of Y, Cr and Cb values to current macroblock 335 being encoded. The location of best matching macroblock 340 in reference picture 330 is encoded in motion vector 345. Reference picture 330 can be an I Frame or P Frame that the decoder may have reconstructed prior to the construction of current picture 325. Best matching macroblock 340 is subtracted from current macroblock 335 (a difference for each of the Y, Cr and Cb components is calculated) resulting in residual error 350. Residual error 350 is encoded with 2D Discrete Cosine Transform (DCT) 355 and then quantized 360. Quantization 360 can be performed to provide spatial compression by, for example, allotting fewer bits to the high frequency coefficients while allotting more bits to the low frequency coefficients. The quantized coefficients of residual error 350, along with motion vector 345 and reference picture 330 identifying information, are encoded information representing current macroblock 335. The encoded information can be stored in memory for future use or operated on for purposes of, for example, error correction or image enhancement, or transmitted over network 365.

The encoded quantized coefficients of residual error 350, along with encoded motion vector 345 can be used to reconstruct current macroblock 335 in the encoder for use as part of a reference frame for subsequent motion estimation and compensation. The encoder can emulate the procedures of a decoder for this P Frame reconstruction. The emulation of the decoder may result in both the encoder and decoder working with the same reference picture. The reconstruction process, whether done in an encoder, for further inter-coding, or in a decoder, is presented here. Reconstruction of a P Frame can be started after the reference frame (or a portion of a picture or frame that is being referenced) is reconstructed. The encoded quantized coefficients are dequantized 370 and then 2D Inverse DCT, or IDCT, 375 is performed resulting in decoded or reconstructed residual error 380. Encoded motion vector 345 is decoded and used to locate the already reconstructed best matching macroblock 385 in the already reconstructed reference picture 330. Reconstructed residual error 380 is then added to reconstructed best matching macroblock 385 to form reconstructed macroblock 390. Reconstructed macroblock 390 can be stored in memory, displayed independently or in a picture with other reconstructed macroblocks, or processed further for image enhancement.

B Frames (or any section coded with bi-directional prediction) can exploit temporal redundancy between a region in a current picture and a best matching prediction region in a previous picture and a best matching prediction region in a subsequent picture. The subsequent best matching prediction region and the previous best matching prediction region are combined to form a combined bi-directional predicted region. The difference between the current picture region and the best matching combined bi-directional prediction region is a residual error (or prediction error). The locations of the best matching prediction region in the subsequent reference picture and the best matching prediction region in the previous reference picture can be encoded in two motion vectors.

Figure 4:
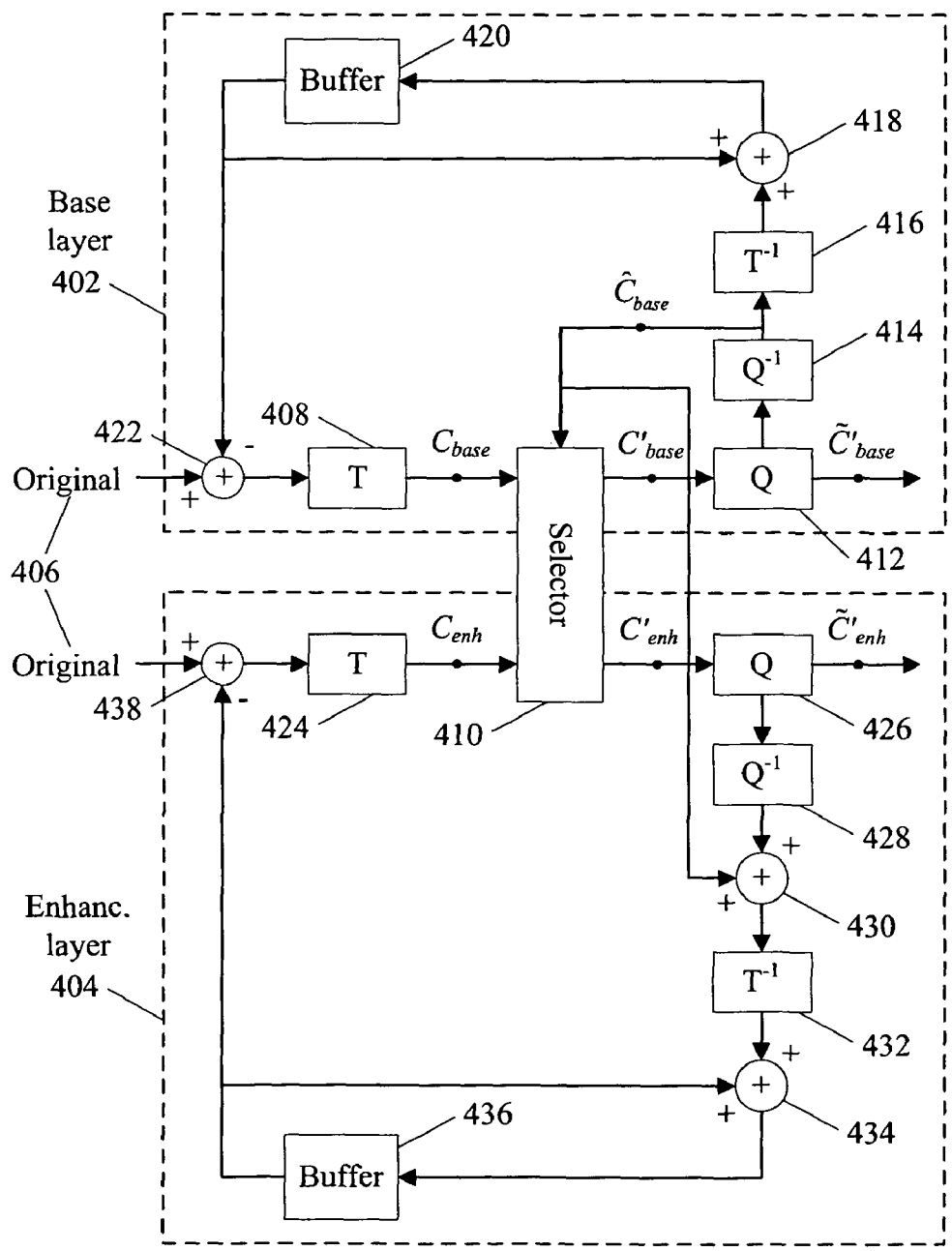
FIG. 4 is an illustration of an example of an encoder process for encoding of base layer and enhancement layer coefficients.

FIG. 4 is an illustration of an example of an encoder process for encoding of base layer and enhancement layer coefficients. The base and enhancement layers are encoded to provide an SNR scalable bitstream. Process 400 depicts an example for encoding inter MB residual error coefficients such as would be done in step 210 of FIG. 2A. However, similar methods could be used to encode intra MB coefficients as well. Encoding means such as SNR scalable encoder component 125 of FIG. 1 can perform process 400 and step 210 of FIG. 2A. Original (to be encoded) video data 406 (video data comprises Luma and Chroma information in this example) is input to a base layer best matching macroblock loop 402 and an enhancement layer best matching macroblock loop 404. Both loops 402 and 404 attempt to minimize the residual error that is calculated at adders 422 and 438 respectively. Loops 402 and 404 can be performed in parallel, as shown, or sequentially. Loops 402 and 404 include logic for searching buffers 420 and 436, respectively, which contain reference frames, to identify the best matching macroblock that minimizes the residual error between the best matching macroblock and original data 406 (buffers 420 and 436 can be the same buffer). The residual errors of loop 402 and loop 404 may be different since base layer loop 402 may generally utilize a coarser quantization step size (a higher QP value) than the enhancement layer loop 404. Transform blocks 408 and 424 transform the residual errors of each loop. In one example, the encoder associates the best matching macroblock (or any size block of pixels) header information and the corresponding motion vector information with the base layer, said block header information and motion vector information being derived from the received original data.

The transformed coefficients are then parsed into base layer and enhancement layer coefficients in selector 410. The parsing of selector 410 can take on several forms, as discussed below. One common feature of the parsing techniques is that the enhancement layer prime coefficient, $C'_{enh}$, is calculated such that it is a differential refinement to the base layer prime coefficient $C'_{base}$. Calculating the enhancement layer to be a refinement to the base layer allows a decoder to decode the base layer coefficient by itself and have a reasonable representation of the image, or to combine the base and enhancement layer coefficients and have a refined representation of the image. The prime coefficients selected and calculated by selector 410 are then quantized by quantizers 412 and 426. The quantized prime coefficients $\tilde{C}'_{base}$ and $\tilde{C}'_{enh}$ (calculated with quantizers 412 and 426 respectively) can be stored in memory means such as memory component 130 in FIG. 1, or transmitted over a network to a decoder.

In order to match the reconstruction of the macroblock in a decoder, dequantizer 414 dequantizes the base layer residual error coefficients. The dequantized residual error coefficients are inverse transformed 416 and added 418 to the best matching macroblock found in buffer 420, resulting in a reconstructed macroblock that matches what may be reconstructed in the decoder. Quantizer 426, dequantizer 428, inverse transformer 432, adder 434 and buffer 436 perform similar calculations in enhancement loop 404 as were done in base layer loop 402. In addition, adder 430 is used to combine the dequantized enhancement layer and base layer coefficients used in the reconstruction of the enhancement layer. The enhancement layer quantizer and dequantizer may generally utilize a finer quantizer step size (a lower QP) than the base layer. One or more elements of process 400 may be omitted, rearranged and/or combined.

Figure 5:
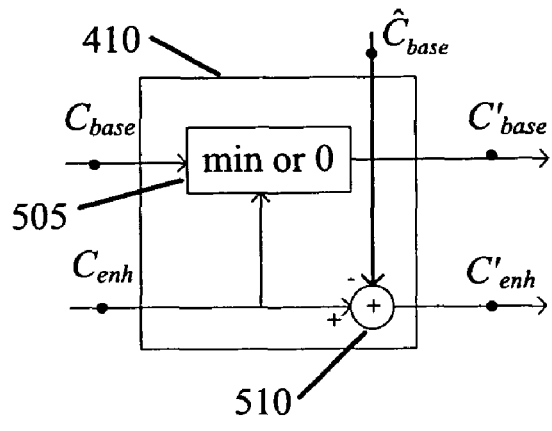
FIG. 5 is an illustration of an example of a base layer and enhancement layer coefficient selector process for use in the process shown in FIG. 4.
Figure 6:
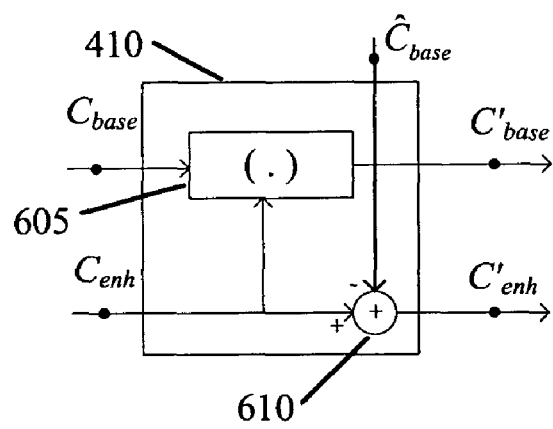
FIG. 6 is an illustration of another example of a base layer and enhancement layer coefficient selector process for use in the process shown in FIG. 4.
Figure 7:
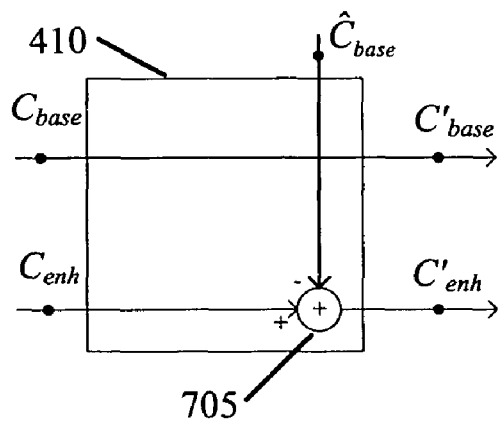
FIG. 7 is an illustration of another example of a base layer and enhancement layer coefficient selector process for use in the process shown in FIG. 4.

FIGS. 5, 6 and 7 show examples of base layer and enhancement layer coefficient selector processes that can be employed in selector 410 of FIG. 4. Selecting means such as SNR scalable encoder component 125 of FIG. 1 can perform the processes depicted in FIGS. 5, 6 and 7. Using FIG. 5 as an example, the transformed coefficients are parsed into base and enhancement layer prime coefficients as follows:

$$C'_{base} = \begin{cases} 0 & \text{if } C_{base} \text{ and } C_{enh} \text{ are opposite signs} \\ \text{sign}(C_{base})\min(|C_{base}|, |C_{enh}|), & \text{otherwise} \end{cases} \quad [1]$$

$$C'_{enh} = C_{enh} - Q_b^{-1}(Q_b(C'_{base})) \quad [2]$$

where the "min" function is a mathematical minimum of the two arguments, and $$\text{sign}(x) = \begin{cases} 1, & \text{if } x \geq 0 \\ -1, & \text{otherwise.} \end{cases}$$

Formula [1] is depicted as block 505 and Formula [2] is depicted as adder 510 in FIG. 5. In Formula [2], $Q_b$ stands for the base layer quantizer 412, and $Q_b^{-1}$ stands for dequantizer 414 of the base layer. Formula [2] converts the enhancement layer coefficient into a differential refinement of the base layer coefficient calculated with Formula [1].

FIG. 6 is an illustration of another example of a base layer and enhancement layer coefficient selector 410. In this example the formula (.) contained in block 605 represents the base layer prime coefficient with the following:

$$C'_{base} = \begin{cases} C_{base}, & \text{if } |Q_b^{-1}Q_b(C_{base}) - C_{enh}| < |C_{enh}| \\ 0, & \text{otherwise} \end{cases} \quad [3]$$

Adder 610 computes the enhancement layer prime coefficient as follows:

$$C'_{enh} = C_{enh} - Q_b^{-1}(Q_b(C'_{base})) \quad [4]$$

where $C'_{base}$ is given by formula [3].

FIG. 7 is an illustration of another example of a base layer and enhancement layer selector 410. In this example, the base layer prime coefficient is unchanged from the original base layer coefficient and the enhancement layer prime coefficient is equal to the difference between the quantized/dequantized base layer coefficient and the original enhancement layer coefficient. Depending on the process, selector 410 may be used with original base layer and original enhancement layer coefficients that are inter-coded or intra-coded coefficients.

Regardless of which example process shown in FIGS. 5, 6 or 7 selector 410 utilizes, the decoder performs the same operations in decoding, as will be discussed below. Loops 402 and 404 can operate synchronously with both layers referencing the same matching macroblock, or asynchronously with each pointing to a different reference macroblock (base layer reference information and enhancement layer reference information may both be encoded in overhead information as discussed below). If loops 402 and 404 point to different reference macroblocks, the decoder may use the encoded base layer reference information for decoding the base layer only, or it may use the encoded enhancement layer reference information for decoding the combined base plus enhancement layer.

In addition to the base and enhancement layer residual error coefficients, the decoder needs information identifying how MB's are encoded. Encoding means such as SNR scalable encoder component 125 of FIG. 1, while performing step 210 of FIG. 2A, encodes overhead information that can include a map of intra-coded and inter-coded portions, such as, for example a MB map where macroblocks (or sub-macroblocks) are identified as being intra-coded or inter-coded, e.g., with an identifier, (also identifying which type of inter-coding including, for example forward, backward or bi-directional) and to which frame(s) inter-coded portions are referenced. In an example embodiment, the MB map and base layer coefficients are encoded in the base layer, and the enhancement layer coefficient are encoded in the enhancement layer.

Figure 8:
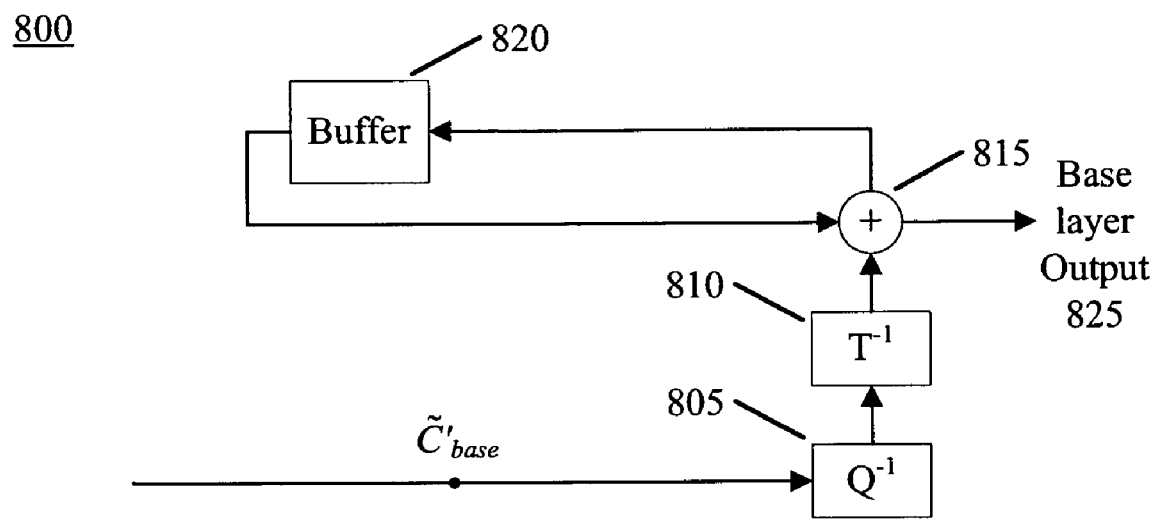
FIG. 8 is an illustration of an example of a decoder process for decoding base layer data.

FIG. 8 is an illustration of an example of a decoder process for decoding a single layer of video data, base layer data in this example, such as would be performed in step 260 of FIG. 2B. In process 800, the quantized coefficients $\tilde{C}'_{base}$ represent either intra-coded data or inter-coded residual error data. The coefficients are dequantized 805, inverse transformed 810 and added 815 to the spatial or temporal prediction data stored in buffer 820. Dequantizing step 805 utilizes the base layer quantization parameter $QP_b$. The resulting decoded base layer video output 825 can be stored in memory means, such as memory component 170 in FIG. 1, or displayed on display means such as display component 190 in FIG. 1.

Process 800 could be repeated in a second pass with enhancement layer coefficients $\tilde{C}'_{enh}$ replacing base layer coefficients $\tilde{C}'_{base}$ and with an enhancement layer quantization parameter $QP_e$ replacing base layer parameter $QP_b$, in step 805. The resulting output may be the decoded enhancement layer video output. The base layer video output 825 can then be combined, in the pixel domain, with the enhancement layer video output. This two-pass process can reuse the same decoder hardware circuitry for efficiency. This decoding process can be used regardless of which encoding process, of those shown in FIGS. 5, 6 or 7, was used.

Figure 9:
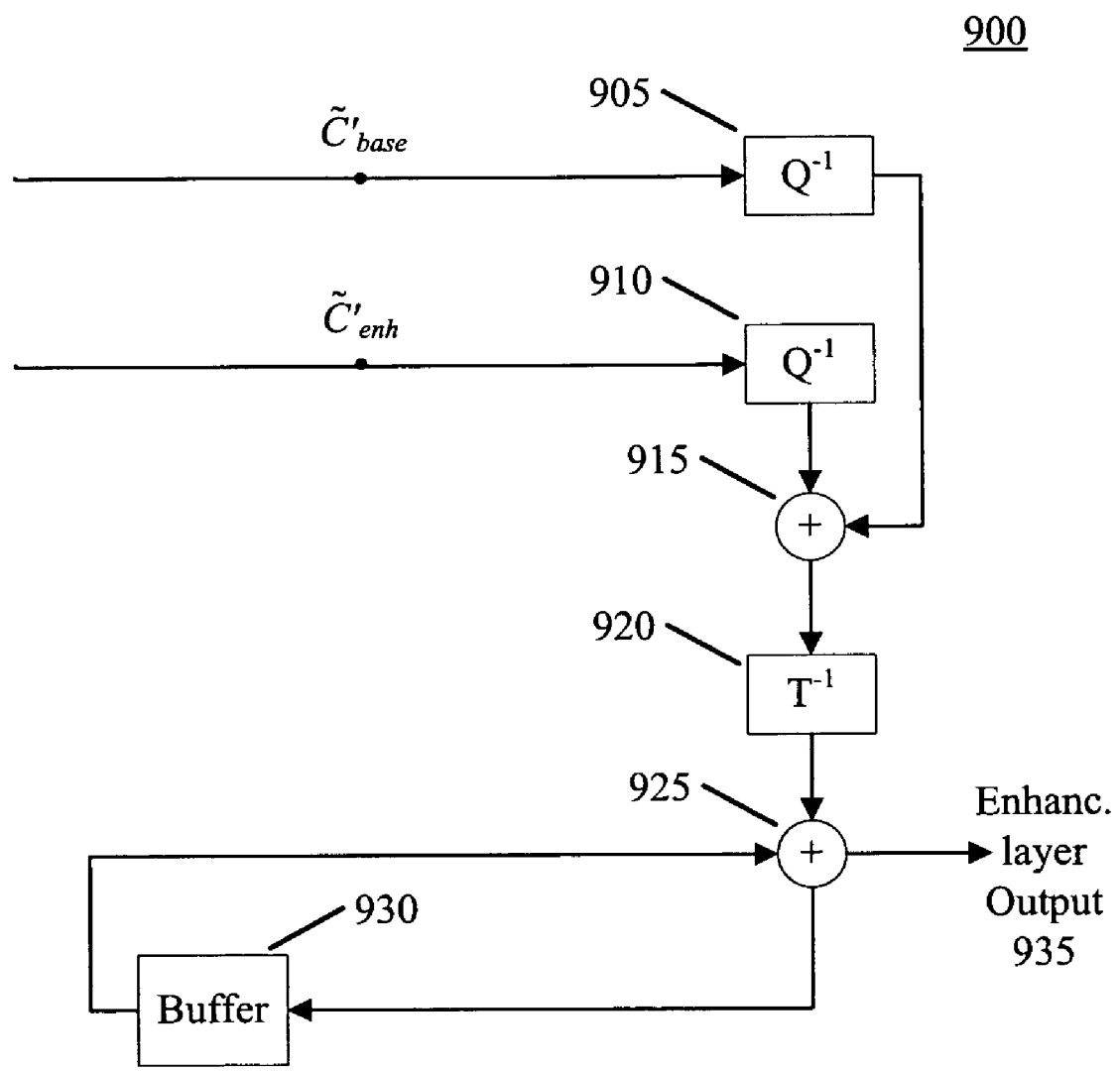
FIG. 9 is an illustration of an example of a decoder process for decoding base layer plus enhancement layer data.

FIG. 9 is an illustration of an example of a decoder process for decoding base layer plus enhancement layer data, such as would be performed in steps 245 and 250 of FIG. 2B. In process 900, the quantized coefficients $\tilde{C}'_{base}$ and $\tilde{C}'_{enh}$ are dequantized, at steps 905 and 910 respectively, and combined, in the transformed (e.g., frequency) domain, at adding step 915. Dequantizing act 905 utilizes base layer quantization parameter $QP_b$ while dequantizing act 910 utilizes a smaller enhancement layer quantization parameter $QP_e$. The combined coefficients are then inverse transformed 920 and added, step 925, to the spatial or temporal prediction data stored in buffer 930. This decoding process can be used regardless of which encoding process, of those shown in FIGS. 5, 6 or 7, was used. The resulting enhancement layer video output 935 can be stored in memory or displayed.

Process 900 differs from process 800 in one major way. Process 900 utilizes two dequantization acts 905 and 910 instead of the one dequantization act 805 in process 800. If dequantization is pipelined in the hardware core, it is highly desirable to have only one dequantization step for enhancement layer decoding as in base layer decoding process 800. One example, for reducing the number of dequantization steps to one, involves utilizing quantization parameters related by mathematical characteristics. The quantization step size doubles for every increment of 6 in Qp for H.264. If $QP_b = QP_e + 6$, then the base layer coefficients can be converted to the enhancement layer scale and combined with the following formula:

$$\hat{C}_{enh} = Q_e^{-1}((\tilde{C}'_{base} << 1) + \tilde{C}'_{enh}) \qquad [5]$$

Figure 10:
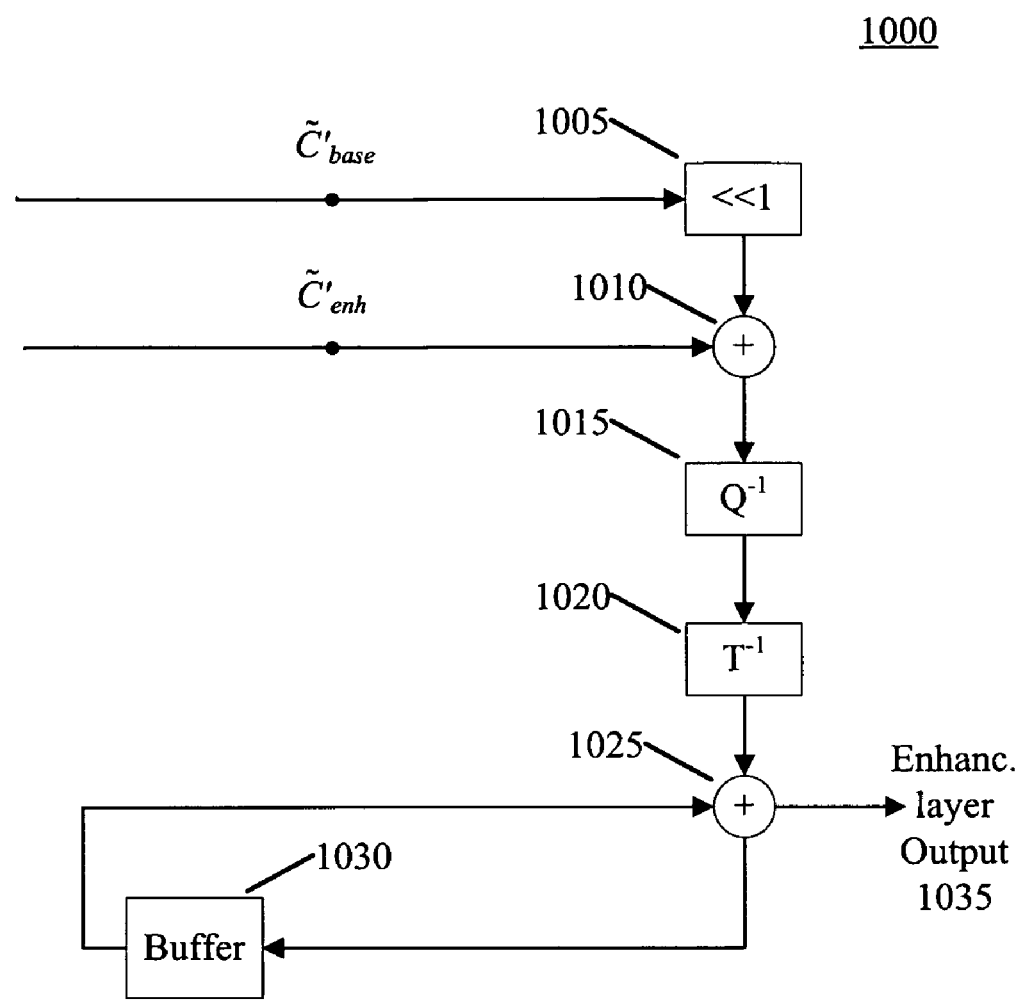
FIG. 10 is an illustration of another example of a decoder process for decoding base layer plus enhancement layer data.

FIG. 10 is an illustration of another example of a decoder process for decoding base layer plus enhancement layer data. Process 1000 utilizes base layer and enhancement layer quantization where $QP_b = QP_e + 6$. As shown in Formula [5], base layer coefficients are converted to enhancement layer scale by shifting (a form of scaling) the coefficients one bit to the left, at step 1005 and added to the enhancement layer coefficient, at 1010. Thus, only one act of dequantization, at step 1015, and one act of inverse transform, at step 1020, are needed. If the base layer coefficient is equal to zero, no shift is necessary. So in order to make use of this property, when both $\tilde{C}^{\sim'}_{base}$ and $\tilde{C}'_{enh}$ are nonzero, the difference between $QP_b$ and $QP_e$ could be a multiple of 6. Other methods besides bit shifting, such as multiplication by a scale factor, e.g. with a scaler, can also be utilized.

P frames and B frames can contain Intra MBs as well as inter MBs. It is common for hybrid video encoders to use rate distortion (RD) optimization to decide to encode certain macroblocks in P or B frames as Intra MBs. In order to have single layer decoding where Intra MB's do not depend on base layer and/or enhancement layer inter MB's, any neighboring inter MBs are not used for spatial prediction of base layer Intra MBs. In order to keep the computational complexity unchanged for the enhancement layer decoding, for the Intra MBs in the base layer P or B frame, the refinement at the enhancement layer could be skipped.

Intra MBs in P or B frames require many more bits than inter MBs. For this reason, Intra MBs in P or B frames could be encoded only at base layer quality at a higher QP. This may introduce some deterioration in video quality, but this deterioration should be unnoticeable if it is refined in a later frame with the inter MB coefficients in the base and enhancement layer as discussed above. Two reasons make this deterioration unnoticeable. The first is a feature of the human visual system (HVS) and the other one is that Inter MBs refine intra MBs. With objects that change position from a first frame to a second frame, some pixels in the first frame are invisible in the second frame (to-be-covered information), and some pixels in the second frame are visible for the first time (uncovered information). Human eyes are not sensitive to the uncovered and to-be-covered visual information. So for the uncovered information, even though it is encoded at a lower quality, the eyes may not tell the difference. If the same information remains in the following P frame, there may be a high chance that the following P frame at the enhancement layer can refine it because the enhancement layer has lower QP.

Another common technique that introduces Intra MBs in P or B frames is known as Intra Refresh. In this case, some MBs are coded as Intra MBs, even though standard R-D optimization would dictate that they could be Inter-coded MBs. These intra-coded MBs, contained in the base layer, can be encoded with either $QP_b$ or $QP_e$. If $QP_e$, is used for the base layer, then no refinement is needed at the enhancement layer. If $QP_b$, is used for the base layer, then refinement may be appropriate, otherwise at the enhancement layer, the drop of quality may be noticeable. Since inter-coding is more efficient than intra-coding in the sense of coding efficiency, these refinements at the enhancement layer may be inter-coded. This way, the base layer coefficients may not be used for the enhancement layer. Therefore the quality gets improved at the enhancement layer without introducing new operations.

B frames are commonly used in enhancement layers because of the high compression qualities they offer. However, B frames may have to reference Intra MBs of a P frame. If the pixels of the B frame were to be encoded at enhancement layer quality, it could require too many bits due to the lower quality of the P frame Intra MBs, as discussed above. By taking advantage of the qualities of the HVS, as discussed above, the B frame MBs could be encoded at a lower quality when referencing lower quality Intra MB's of P frames.

One extreme case of Intra MBs in P or B frames is when all MBs in a P or B frame are encoded at Intra mode due to the presence of a scene change in the video being encoded. In this case the whole frame can be coded at the base layer quality and no refinement at the enhancement layer. If a scene change occurs at a B frame, and assume that B frames are only encoded in the enhancement layer, then the B frame could be encoded at base layer quality or simply dropped. If a scene change occurs at a P frame, no changes are necessary, but the P frame could be dropped or encoded at base layer quality.

The encoding example processes described above utilized methods of selecting base layer and enhancement layer coefficient after the original data was transformed. Similar parsing techniques could be used prior to transforming the coefficients.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. For example, a storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus.

Thus, A method and apparatus to provide acceptable quality video at a base layer and higher quality video at an enhancement layer, with minimum decoder overhead have been described.

What is claimed is:

1. A method for decoding a multimedia bitstream, comprising:
   receiving a base layer of encoded data and an enhancement layer of encoded data;
   receiving a residual error coefficient in the base layer of encoded data and receiving a differential refinement to the base layer residual error coefficient in the enhancement layer of encoded data, wherein the base layer residual error coefficient is either a minimum of an original base layer residual error coefficient and an original enhancement layer residual error coefficient or zero, and the enhancement layer differential refinement is determined based on the base layer residual error coefficient and the original enhancement layer residual error coefficient;
   combining the received base layer of encoded data and the received enhancement layer of encoded data;
   combining the base layer residual error coefficient and the differential refinement with the combined base layer and enhancement layer of encoded data; and
   decoding the combined base layer and enhancement layer of encoded data, and the combined base layer residual error coefficient and the differential refinement.

2. The method of claim 1, wherein the base layer residual error coefficient is zero when the original base layer residual error coefficient and the original enhancement layer residual error coefficient have opposite signs, and wherein the base layer residual error coefficient is a minimum of the original base layer residual error coefficient and the original enhancement layer residual error coefficient when the original base layer residual error coefficient and the original enhancement layer residual error coefficient have the same signs.

3. The method of claim 1, further comprising:
   converting the base layer of encoded data from a first quantization step size to a second quantization step size, wherein the received enhancement layer of encoded data is encoded in the second quantization step size.

4. The method of claim 1, further comprising identifying intra-coded data in the received base layer of encoded data and identifying a differential refinement to received base layer intra-coded data in the received enhancement layer of encoded data.

5. The method of claim 4, wherein decoding the combined base layer and enhancement layer of encoded data, and the combined base layer residual error coefficient and the differential refinement occurs with respect to inter-coded data, the method further comprising:
- decoding the base layer intra-coded data in a first pass for decoding;
- decoding enhancement layer intra-coded data in a second pass for decoding; and
- combining the decoded base layer intra-coded data and the decoded enhancement layer intra-coded data.

6. The method of claim 1, further comprising;
- dequantizing the combined base layer and enhancement layer of encoded data; and
- inverse transforming the dequantized data.

7. The method of claim 1, further comprising:
- identifying inter-coded data in combined data, the combined data being the combined base layer and enhancement layer of encoded data, and the combined base layer residual error coefficient and the differential refinement, said inter-coded data being associated with the base layer;
- identifying inter-coded data in the combined data, said inter-coded data being associated with the enhancement layer; and
- decoding either the identified inter-coded data associated with the base layer or the identified inter-coded data associated with the base and enhancement layers.

8. The method of claim 1, further comprising:
- identifying intra-coded data in combined data, the combined data being the combined base layer and enhancement layer of encoded data, and the combined base layer residual error coefficient and the differential refinement said intra-coded data being only associated with the base layer; and
- decoding the identified intra-coded data.

9. The method of claim 1, further comprising:
- identifying intra-coded data in combined data, the combined data being the combined base layer and enhancement layer of encoded data, and the combined base layer residual error coefficient and the differential refinement;
- identifying inter-coded data in the combined data ; and
- decoding either the identified intra-coded data or the identified inter-coded data.

10. An apparatus for decoding a multimedia bitstream, comprising:
- means for receiving a base layer of encoded data and an enhancement layer of encoded data;
- means for receiving a residual error coefficient in the base layer of encoded data and receiving a differential refinement to the base layer residual error coefficient in the enhancement layer of encoded data, wherein the base layer residual error coefficient is either a minimum of an original base layer residual error coefficient and an original enhancement layer residual error coefficient or zero, and the enhancement layer differential refinement is determined based on the base layer residual error coefficient and the original enhancement layer residual error coefficient
- means for combining the received base layer of encoded data and the received enhancement layer of encoded data;
- means for combining the base layer residual error coefficient and the differential refinement with the combined base layer and enhancement layer of encoded data; and
- means for decoding combined data, wherein the means for decoding further comprises means for decoding the combined base layer and enhancement layer of encoded data, and the combined base layer residual error coefficient and the differential refinement.

11. The apparatus of claim 10, wherein the base layer residual error coefficient is zero when the original base layer residual error coefficient and the original enhancement layer residual error coefficient have opposite signs, and wherein the base layer residual error coefficient is a minimum of the original base layer residual error coefficient and the original enhancement layer residual error coefficient when the original base layer residual error coefficient and the original enhancement layer residual error coefficient have the same signs.

12. The apparatus of claim 10; further comprising:
- means for converting the base layer of encoded data from a first quantization step size to a second quantization step size, wherein the received enhancement layer of encoded data is encoded in the second quantization step size.

13. The apparatus of claim 12, wherein the means for converting further comprises:
- means for bit shifting the base layer of encoded data.

14. The apparatus of claim 10, wherein the means for receiving further comprises:
- means for identifying intra-coded data in the received base layer of encoded data and for identifying a differential refinement to the received base layer intra-coded data in the received enhancement layer of encoded data.

15. The apparatus of claim 14, further comprising:
- means for decoding the identified base layer intra-coded data in a first pass, for decoding;
- means for decoding identified enhancement layer intra-coded data in a second pass for decoding; and
- means for combining the decoded base layer intra-coded data and the decoded enhancement layer intra-coded data.

16. The apparatus of claim 10, wherein the means for decoding further comprises:
- means for dequantizing the combined base layer and enhancement layer of encoded data; and
- means for inverse transforming the dequantized data.

17. An apparatus for decoding a multimedia bitstream, comprising:
- a receiver to receive a base layer of encoded data and an enhancement layer of encoded data, wherein the receiver receives a residual error coefficient in the base layer of encoded data and receives a differential refinement to the base layer residual error coefficient in the enhancement layer of encoded data, wherein the base layer residual error coefficient is either a minimum of an original base layer residual error coefficient and an original enhancement layer residual error coefficient or zero, and the enhancement layer differential refinement is determined based on the base layer residual error coefficient and the original enhancement layer residual error coefficient;
- a combiner to combine the received base layer of encoded data and the received enhancement layer of encoded data, wherein the combiner combines the base layer residual error coefficient and the differential refinement with the combined base layer and enhancement layer of encoded data; and a decoder to decode the combined base layer and enhancement layer of encoded data, and the combined base layer residual error coefficient and the differential refinement.

18. The apparatus of claim 17, wherein the base layer residual error coefficient is zero when the original base layer residual error coefficient and the original enhancement layer residual error coefficient have opposite signs, and wherein the base layer residual error coefficient is a minimum of the original base layer residual error coefficient and the original enhancement layer residual error coefficient when the original base layer residual error coefficient and the original enhancement layer residual error coefficient have the same signs.

19. The apparatus of claim 17, further comprising a scaler configured to convert the base layer of encoded data from a first quantization step size to a second quantization step size, wherein the received enhancement layer of encoded data is encoded in the second quantization step size.

20. The apparatus of claim 17, further comprising an identifier configured to identify intra-coded data in the received base layer of encoded data and to identify a differential refinement to received base layer intra-coded data in the received enhancement layer of encoded data.

21. The apparatus of claim 17, wherein decoding the combined base layer and enhancement layer of encoded data, and the combined base layer residual error coefficient and the differential refinement occurs with respect to inter-coded data, wherein the decoder is further configured to:

decode the base layer intra-coded data in a first pass for decoding; and decode enhancement layer intra-coded data in a second pass for decoding, and wherein the combiner is further configured to combine the decoded base layer intra-coded data and the decoded enhancement layer intra-coded data.

22. The apparatus of claim 17, further comprising a dequantizer configured to dequantize the combined base layer and enhancement layer of encoded data, and a transformer configured to inverse transform the dequantized data.

23. A computer-readable medium embodying a method for decoding a multimedia bitstream, the method comprising:

receiving a base layer of encoded data and an enhancement layer of encoded data;

receiving a residual error coefficient in the base layer of encoded data and receiving a differential refinement to the base layer residual error coefficient in the enhancement layer of encoded data, wherein the base layer residual error coefficient is either a minimum of an original base layer residual error coefficient and an original enhancement layer residual error coefficient or zero, and the enhancement layer differential refinement is determined based on the base layer residual error coefficient and the original enhancement layer residual error coefficient;

combining the received base layer of encoded data and the received enhancement layer of encoded data;

combining the base layer residual error coefficient and the differential refinement with the combined base layer and enhancement layer of encoded data; and decoding the combined base layer and enhancement layer of encoded data, and the combined base layer residual error coefficient and the differential refinement.

24. The computer readable medium of claim 23, wherein the base layer residual error coefficient is zero when the original base layer residual error coefficient and the original enhancement layer residual error coefficient have opposite signs, and wherein the base layer residual error coefficient is a minimum of the original base layer residual error coefficient and the original enhancement layer residual error coefficient when the original base layer residual error coefficient and the original enhancement layer residual error coefficient have the same signs.

25. The computer readable medium of claim 23, wherein the method further comprises:

converting the base layer of encoded data from a first quantization step size to a second quantization step size, wherein the received enhancement layer of encoded data is encoded in the second quantization step size.

26. The computer readable medium of claim 23, wherein the method further comprises identifying intra-coded data in the received base layer of encoded data and identifying a differential refinement to the received base layer of encoded data in the received enhancement layer of encoded data.

27. The computer readable medium of claim 26, wherein decoding combined data occurs with respect to inter-coded data, the combined data being the combined base layer and enhancement layer of encoded data, and the combined base layer residual error coefficient and the differential refinement, wherein the method further comprises:

decoding the identified base layer intra-coded data in a first pass for decoding;

decoding enhancement layer intra-coded data in a second pass for decoding; and combining the decoded base layer intra-coded data and the decoded enhancement layer intra-coded data.

28. The computer readable medium of claim 23, wherein the method further comprises;

dequantizing the combined base layer and enhancement layer of encoded data; and inverse transforming the dequantized data.

29. A processor for decoding a multimedia bitstream, the processor configured to:

receive a base layer of encoded data and an enhancement layer of encoded data;

receive a residual error coefficient in the base layer of encoded data and receive a differential refinement to the base layer residual error coefficient in the enhancement layer of encoded data, wherein the base layer residual error coefficient is either a minimum of an original base layer residual error coefficient and an original enhancement layer residual error coefficient or zero, and the enhancement layer differential refinement is determined based on the base layer residual error coefficient and the original enhancement layer residual error coefficient;

combine the received base layer of encoded data and the received enhancement layer of encoded data;

combine the base layer residual error coefficient and the differential refinement with the combined base layer and enhancement layer of encoded data; and decode the combined base layer and enhancement layer of encoded data, and the combined base layer residual error coefficient and the differential refinement.

30. The processor of claim 29, wherein the base layer residual error coefficient is zero when the original base layer residual error coefficient and the original enhancement layer residual error coefficient have opposite signs, and wherein the base layer residual error coefficient is a minimum of the original base layer residual error coefficient and the original enhancement layer residual error coefficient when the original base layer residual error coefficient and the original enhancement layer residual error coefficient have the same signs.

31. The processor of claim 29, further configured to convert the base layer of encoded data from a first quantization step size to a second quantization step size, wherein the received enhancement layer of encoded data is encoded in the second quantization step size.

32. The processor of claim 29, further configured to identify intra-coded data in the received base layer of encoded data and to identify a differential refinement to received base layer intra-coded data in the received enhancement layer of encoded data.

33. The processor of claim 32, further configured to decode the identified base layer intra-coded data in a first pass for decoding, to decode identified enhancement layer intra-coded data in a second pass for decoding, and to combine the decoded base first layer intra-coded data and the decoded enhancement layer intra-coded data.

34. The processor of claim 29, further configured to dequantize the combined base layer and enhancement layer of encoded data, and to inverse transform the dequantized data.

35. A method of encoding multimedia data, comprising:
selecting data for encoding in a first layer and a second layer to allow decoding of the data in a, single combined layer, wherein the first layer of encoded data comprises a first coefficient, the second layer of encoded data comprises a second coefficient, and the first and second coefficients are used for decoding;
selecting a first prime coefficient based on the first and second, coefficients:
calculating a second prime coefficient based on the first and second coefficients; and
encoding the selected data in the first layer and the second layer, wherein encoding further comprises using the first prime coefficient for encoding in the first layer, and using the second prime coefficient for encoding in the second layer,
wherein the first coefficient is a base layer residual error coefficient and the second coefficient is an enhancement layer residual error coefficient, and further wherein selecting further comprises selecting the first prime coefficient to be either a minimum of the first coefficient and the second coefficient or zero, and calculating further comprises setting the second prime coefficient equal to the second coefficient.

36. The method of claim 35, wherein encoding comprises:
encoding a differential refinement of the first layer coefficient in the second layer.

37. The method of claim 35, wherein the first prime coefficient is zero when the first coefficient and the second coefficient have opposite signs, and wherein the first prime coefficient is a minimum of the first coefficient and the second coefficient when the first coefficient and the second coefficient have the same signs.

38. The method of claim 35, wherein the method further comprises associating block header information and motion vector information with the first layer, said block header information and motion vector information being derived from the received data.

39. The method of claim 35, wherein the method further comprises quantizing the first layer of encoded data at a first step size, and quantizing the second layer of encoded data at a second step size, wherein the first step size and second step size are, related by a scale factor.

40. The method of claim 35, wherein the data comprises intra-coded data and further wherein encoding further comprises encoding the intra-coded data in the first layer or in the first and second layers.

41. The method of claim 35, wherein the data comprises inter-coded data, wherein encoding further comprises encoding the inter-coded data in the second layer.

42. The method of claim 35, wherein encoding further comprises encoding some of the selected data as inter-coded data in the first layer and some of the selected data as inter-coded data in the second layer.

43. The method of claim 35, wherein encoding further comprises encoding the selected data as intra-coded data in the first layer.

44. The method of claim 35, wherein encoding further comprises encoding some of the selected data as intra-coded data in the first layer and some of the selected data as inter-coded data in the second layer.

45. The method of claim 35, further comprising encoding overhead information, wherein the overhead information is a member of a group consisting of data identifying a number of layers, data identifying a layer as a base layer, data identifying a layer as an enhancement layer, data identifying an inter-relationship between layers, and data identifying a layer as a final enhancement layer.

46. An apparatus for encoding multimedia data, comprising:
means for selecting data for encoding in a first layer and a second layer to allow decoding of the data in a single combined layer, wherein the first layer of encoded data comprises a first coefficient, the second layer of encoded data comprises a second coefficient, and the first and second coefficients are used for decoding;
means for selecting a first prime coefficient based on the first and second coefficients;
means for calculating a second prime coefficient based on the first and second coefficients; and
means for encoding the selected data in the first layer and the second layer, wherein means for encoding further comprises means for using the first prime coefficient for encoding in the first layer, and means for using the second prime coefficient for encoding in the second layer,
wherein the first coefficient is a base layer residual error coefficient and the second coefficient is an enhancement layer residual error coefficient, and further wherein means for selecting further comprises means for selecting the first prime coefficient to be either a minimum of the first coefficient and the second coefficient or zero, and means for calculating further comprises means for setting the second prime coefficient equal to the second coefficient.

47. The apparatus of claim 46, wherein the means for encoding comprises:
means for encoding a differential refinement of the first layer coefficient in the second layer.

48. The apparatus of claim 46, wherein the first prime coefficient is zero when the first coefficient and the second coefficient have opposite signs, and wherein the first prime coefficient is a minimum of the first coefficient and the second coefficient when the first coefficient and the second coefficient have the same signs.

49. The apparatus of claim 46, further comprising:
means for associating block header information and motion vector information with the first layer, said block header information and motion vector information being derived from the received data.

50. The apparatus of claim 46, further comprising:
means for quantizing the first layer of encoded data at a first step size; and
means for quantizing the second layer of encoded data at a second step size, wherein the first step size and second step size are related by a scale factor.

51. The apparatus of claim 46, wherein the data is intra-coded data and further wherein means for encoding encodes the intra-coded data in the first layer or in the first and second layers.

52. The apparatus of claim 46, wherein the data is inter-coded data and further wherein means for encoding encodes the inter-coded data in the second layer.

53. The apparatus of claim 46, further comprising:
means for encoding overhead information, wherein the overhead information is a member of a group consisting of data identifying a number of layers, data identifying a layer as a base layer, data identifying a layer as an enhancement layer, data identifying an inter-relationship between layers, and data identifying a layer as a final enhancement layer.

54. A computer-readable medium embodying a method for encoding multimedia data, the method comprising:
selecting data for encoding in a first layer and a second layer to allow decoding of the data in a single combined layer, wherein the first layer of encoded data comprises a first coefficient, the second layer of encoded data comprises a second coefficient and the first and second coefficients are used for decoding;
selecting a first prime coefficient based on the first and second coefficients;
calculating a second prime coefficient based on the first and second coefficients; and
encoding the selected data in the first layer and the second layer, wherein encoding further comprises using the first prime coefficient for encoding in the first layer, and using the second prime coefficient for encoding in the second layer,
wherein the first coefficient is a base layer residual error coefficient and the second coefficient is an enhancement layer residual error coefficient, and further wherein selecting further comprises selecting the first prime coefficient to be either a minimum of the first coefficient and the second coefficient or zero, and calculating further comprises setting the second prime coefficient equal to the second coefficient.

55. The computer-readable medium of claim 54, wherein encoding comprises:
encoding a differential refinement of the first layer coefficient in the second layer.

56. The computer-readable medium of claim 54, wherein the first prime coefficient is zero when the first coefficient and the second coefficient have opposite signs, and wherein the first prime coefficient is a minimum of the first coefficient and the second coefficient when the first coefficient and the second coefficient have the same signs.

57. The computer-readable medium of claim 54, wherein the method further comprises associating block header information and motion vector information with the first layer, said block header information and motion vector information being derived from the received data.

58. The computer-readable medium of claim 54, wherein the method further comprises quantizing the first layer of encoded data at a first step size, and quantizing the second layer of encoded data at a second step size, wherein the first step size and second step size are related by a scale factor.

59. The computer-readable medium of claim 54, wherein the method further comprises encoding overhead information, wherein the overhead information is a member of a group consisting of data identifying a number of layers, data identifying a layer as a base layer, data identifying a layer as an enhancement layer, data identifying an inter-relationship between layers, and data identifying a layer as a final enhancement layer.

60. A processor for encoding multimedia data, the processor configured to control the method comprising:
selecting data for encoding in a first layer and a second layer to allow decoding of the data in a single combined layer, wherein the first layer of encoded data comprises a first coefficient, the second layer of encoded data comprises a second coefficient, and the first and second coefficients are used for decoding;
selecting a first prime coefficient based on the first and second coefficients;
calculating a second prime coefficient based on the first and second coefficients; and
encoding the selected data in the first layer and the second layer, wherein encoding further comprises using the first prime coefficient for encoding in the first layer, and using the second prime coefficient for encoding in the second layer, wherein the first coefficient is a base layer residual error coefficient and the second coefficient is an enhancement layer residual error coefficient, and further wherein selecting further comprises selecting the first prime coefficient to be either a minimum of the first coefficient and the second coefficient or zero, and calculating further comprises setting the second prime coefficient equal to the second coefficient.

61. The processor of claim 60, wherein encoding comprises:
encoding a differential refinement of the first layer coefficient in the second layer.

62. The processor of claim 60, wherein the first prime coefficient is zero when the first coefficient and the second coefficient have opposite signs, and wherein the first prime coefficient is a minimum of the first coefficient and the second coefficient when the first coefficient and the second coefficient have the same signs.

63. The processor of claim 60, wherein the method further comprises associating block header information and motion vector information with the first layer, said block header information and motion vector information being derived from the received data.

64. The processor of claim 60, wherein the method further comprises quantizing the first layer of encoded data at a first step size, and quantizing the second layer of encoded data at a second step size, wherein the first step size and second step size are related by a scale factor.

65. The processor of claim 60, wherein the method further comprises: encoding overhead information, wherein the overhead information is a member of a group consisting of data identifying a number of layers, data identifying a layer as a base layer, data identifying a layer as an enhancement layer, data identifying an inter-relationship between layers, and data identifying a layer as a final enhancement layer.

66. Apparatus for encoding multimedia data, comprising:
a receiver configured to select data for encoding in a first layer and a second layer to allow decoding of the data in a single combined layer, wherein the first layer of encoded data comprises a first coefficient, the second layer of encoded data comprises a second coefficient, and the first and second coefficients are used for decoding, wherein the receiver is further configured to select a first prime coefficient based on the first and second coefficients, and calculate a second prime coefficient based on the first and second coefficients; and an encoder configured to encode the selected data in the first layer and the second layer, wherein the encoder uses the first prime coefficient for encoding in the first layer, and uses the second prime coefficient for encoding in the second layer, wherein the first coefficient is a base layer residual error coefficient and the second coefficient is an enhancement layer residual error coefficient, and further wherein:

in selecting, the receiver selects the first prime coefficient to be either a minimum of the first coefficient and the second coefficient or zero, and in calculating, the receiver sets the second prime coefficient equal to the second coefficient.

67. The apparatus of claim 66, wherein the encoder is further configured to:

encode a differential refinement of the first layer coefficient in the second layer.

68. The processor of claim 66, wherein the first prime coefficient is zero when the first coefficient and the second coefficient have opposite signs, and wherein the first prime coefficient is a minimum of the first coefficient and the second coefficient when the first coefficient and the second coefficient have the same signs.

* * * * *